United States Patent [19]

Rice et al.

[11] 4,046,619

[45] Sept. 6, 1977

[54] METHOD OF TREATING THE SURFACE OF A GLASS MEMBER

[75] Inventors: Stephen H. Rice, Forestville; Rodney S. Spencer, College Park; Charles M. Fleetwood, Jr., Odenton, all of Md.

[73] Assignee: The United States of America as represented by the Administrator of the National Aeronautics and Space Administration, Washington, D.C.

[21] Appl. No.: 682,435

[22] Filed: May 3, 1976

[51] Int. Cl.² .................... C03C 15/00; C03C 25/06
[52] U.S. Cl. .................................... 156/645; 156/663
[58] Field of Search ............... 156/5, 6, 24, 25, 645, 156/663; 65/31

[56] References Cited

U.S. PATENT DOCUMENTS

| 2,245,137 | 6/1941 | Spielholz | 156/25 X |
|---|---|---|---|
| 2,275,602 | 3/1942 | Beck et al. | 156/645 X |
| 2,999,013 | 9/1961 | Meth | 156/6 |
| 3,527,628 | 9/1970 | Fullerton et al. | 156/24 X |
| 3,813,568 | 5/1974 | Scott et al. | 313/92 R |
| 3,976,523 | 8/1976 | Andreeva et al. | 156/6 |

Primary Examiner—William A. Powell
Attorney, Agent, or Firm—John O. Tresansky; Robert D. Marchant; John R. Manning

[57] ABSTRACT

A method of treating a surface of a glass member intended to abut a transparent element for disrupting the light interference fringes formed therebetween. The method involves the steps of grinding the surface to form irregularities thereon; bathing the surface with an aqueous solution containing between substantially 41.3 percent and 45.7 percent by volume of sulfuric acid and between substantially 54.3 percent and 58.7 percent by volume of hydrofluoric acid for a time sufficient to polish the irregularities until the glass member is about 90 percent light transmissive; and washing the glass member with a liquid having a temperature substantially lower than the temperature of the aqueous solution for preventing further reaction between the aqueous solution and the surface.

9 Claims, 7 Drawing Figures

METHOD OF TREATING THE SURFACE OF A GLASS MEMBER

ORIGIN OF THE INVENTION

The invention described herein was made by employees of the U.S. Government and may be manufactured and used by or for the Government for governmental purposes without payment of any royalties thereon or therefore.

BACKGROUND OF THE INVENTION

1. Field of the Invention

This invention relates generally to glass surface treatment processes and more particularly to a method of preparing an optical glass surface for use in photography.

2. Description of the Prior Art

In the photographic industry it is common practice to use a contact printer to reproduce an image formed on one film negative on a second unexposed raw stock film and to use an enlarger to form an enlarged image of an image formed on a film negative. The conventional contact printer generally includes a transparent glass plate which the exposed film negative with the image formed thereon is placed with the emulsion side away from the glass plate. An unexposed raw stock film negative is placed on top of the exposed film with the emulsion side in contact with the exposed film. A transparent pressure platen is placed on top of the unexposed film to ensure that the two films are held in contact with the glass plate. A light is shown through the glass plate, exposed film, unexposed raw stock film and pressure platen to duplicate the image on the unexposed raw stock film.

The conventional enlarger also includes a transparent glass plate, upon which the film negative with the image to be enlarged is placed with the emulsion side away from the glass plate. A transparent pressure platen is placed on top of the exposed film to keep the exposed film in contact with the glass plate. The unexposed raw stock film upon which an enlarged image is to be reproduced is spaced above and in alignment with the exposed film. A light source shines through a condenser lenses located between the light source and the glass plate to pass substantially parallel light through the glass plate, exposed film, and glass platen. The light then passes through a projection lens located between the pressure platen and the unexposed raw stock film to enlarge the image. This enlarged image is then reproduced on the unexposed raw stock film.

It has been found that interference fringes, commonly known as Newton Rings, are formed between the glass plate and the abutting exposed film negative. The interference fringes are formed because of the wavey characteristics of the polished surface of the glass plate and the surface of the exposed film negative which causes wedges of air to be formed between the glass plate and film negative. Thus, as the light travels through air the wedges between the glass plate and the exposed film the optical path length for individual light rays will be different. This change in optical path length causes destructive interference between light rays when they are out of phase and constructive interference between light rays when they are in phase. This combination of destructive and constructive interference forms alternating light and dark rings, known as Newton Rings, between the glass plate and the film. When the image on the exposed film is duplicated on the raw stock film in the contact printer or the enlarger the interference fringes are also duplicated on the raw stock film. These interference fringes are obviously unwanted especially when high resolution is desired.

In the past, numerous methods have been used to breakup the interference fringes into a multiplicity of minute interference fringes which would not be duplicated on the raw stock film. One method has been to place a matted exposed film negative between the exposed film negative and the glass plate. This produces an irregular surface that breaks up the large interference fringes and forms a plurality of minute interference fringes that will not be reproduced. Another method has been to coat the glass plate with anti-reflection coatings which change the index of refraction of the surface of the glass plate so that the surface of the glass plate approaches the index of refraction of air. This technique supresses the intensity of the interference fringes and may also break up the large interference fringes and produce a multiplicity of smaller interference fringes. A further method has been to apply certain resins on the surface of the glass plate which again lowers the index of refraction of the surface so that it is as close as possible to the index refraction of air.

These prior art techniques perform the job of breaking up the large interference fringes into a multiplicity of smaller interference fringes adequately. However, they do have a number of distinct disadvantages. One disadvantage is that these methods are not particularly durable in that during the process of moving the exposed film negative across each surface the material degrades quite rapidly and consequently the matted exposed film, anti-reflection coatings and resins must be replaced frequently to produce the desired results. These methods also require constant checking and testing of the various coatings and the matted exposed film to detect when the degrading of the coatings and matted exposed film have reached the point where they no longer produce the multiplicity of smaller interference fringes. This, of course, is quite time consuming and costly and the production costs thereby increase enormously to the point where it is not economically feasibility to utilize contact printing or to make enlargements.

OBJECTS OF THE INVENTION

Accordingly one object of the invention is to provide a method of treating the surface of a glass member for disrupting the light interference fringes.

Another object of this invention is to provide a novel method of disrupting light interference fringes formed between the surface of a glass member and an abutting transparent element.

Still another object of the invention is to provide an improved method of treating the surface of a glass member for disrupting light interference fringes which substantially maintains the grade of the surface over a long period of time.

A further object is to provide a new and improved inexpensive method for treating a surface of a glass member for disrupting light interference fringes which substantially eliminates the need for constant replacing, checking, and testing of the surface.

A still further object is to provide a method of treating a surface of a glass member for disrupting light interference fringes which permits high resolution.

Another object is to provide a new and improved method of treating a surface of a glass member for disrupting light interference fringes which is useful in photography.

A still another object is to provide a novel method of treating a surface of a glass member for disrupting light interference fringes which is useful in photographic contact printing and enlarging.

SUMMARY OF THE INVENTION

Briefly, these and other objects are obtained by providing a method of treating a surface of a glass member abutting a transparent element to disrupt the light interference fringes formed therebetween. This method generally comprises the steps of grinding the surface to form irregularities thereon; bathing the surface with an aqueous solution containing between substantially 41.3 percent and 45.7 percent by volume of sulfuric acid and between substantially 54.3 percent and 58.7 percent by volume of hydrofluoric acid for a time sufficient to polish the irregularities until the glass member is about 90 percent light transmissive; and washing the glass member with a liquid having a temperature substantially lower than the temperature of the aqueous solution for preventing further reaction between the aqueous solution and the surface.

The above and further objects and novel features of the invention will appear more fully from the following detailed description when read in connection with the accompanying drawings. It is to be expressly understood, however, that the drawings are not intended as a definition of the invention but are for the purpose of illustration only.

BRIEF DESCRIPTION OF THE DRAWINGS

In the drawings where like parts are designated by like references.

DESCRIPTION OF THE PREFERRED EMBODIMENT

Figure 1:
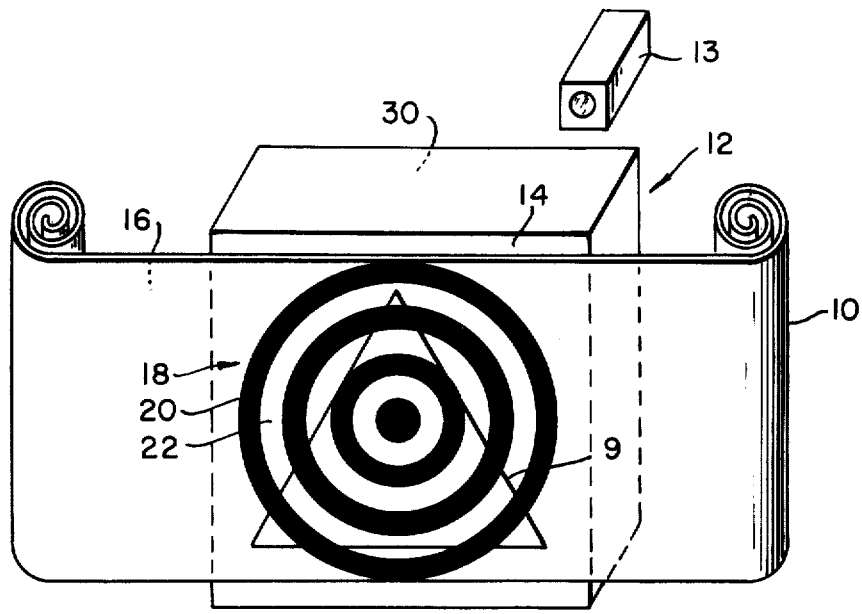
FIG. 1 is a perspective view of the glass member showing an untreated surface with the transparent element in contact therewith and illustrating the interference fringes formed therebetween.
Figure 2:
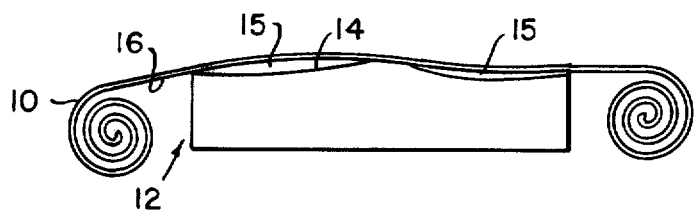
FIG. 2 is an enlarged side view of the glass member and transparent element of FIG. 1 showing the surface prior to treatment.

FIG. 1 illustrates the effect seen, for example, by a conventional contact printer or a conventional photographic enlarger when duplicating or enlarging an image 9 that has been exposed on a photographic film 10. In the typical contact printer or photographic enlarger, the exposed film 10 is positioned upon a glass member, generally designated by numeral 12, and a light source 13 is positioned to shine a light through the glass member and exposed film to either produce a duplicate image 9, as in the case of the contact printer, or reproduce an enlarged image 9, as in the case of an enlarger, on an unexposed raw stock film (not shown). As shown in FIG. 2 the contacting surfaces of glass member 12 and of exposed film 10, designated as 14 and 16, respectively, are smooth but slightly wavey, thereby forming air wedges 15 between these surfaces, these wedges 15 act as a thin film and when light shines through the glass member and through the exposed film light interference fringes 18 are formed therebetween. Interference fringes 18 include alternating dark fringes 20 and light fringes 22 which are commonly known as Newton Rings. When the raw stock film (not shown) in the case of the contact printer or the enlarger, is exposed, the alternating dark and light fringes appear thereon. These dark and light fringes are extremely undesirable when they appear on the raw stock film along with image 9, especially when high resolution, clarity, or detailed analysis of the photographic is desired.

Figure 3:
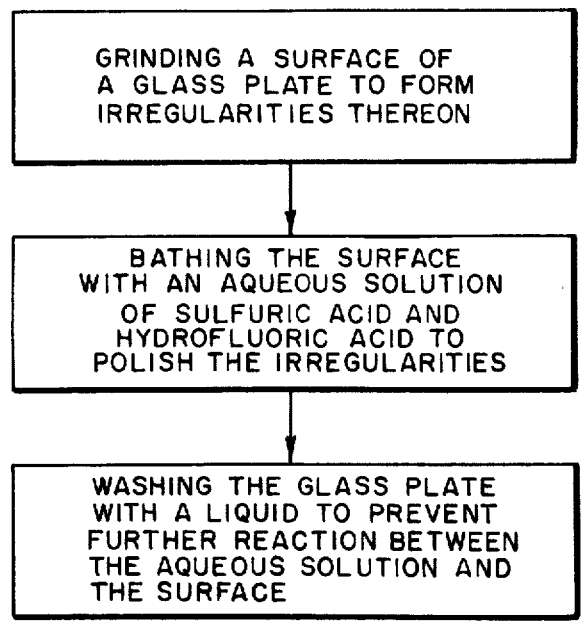
FIG. 3 is a block flow diagram broadly showing the sequence of steps of the method of treating a surface of a glass member according to the present invention.
Figure 4:
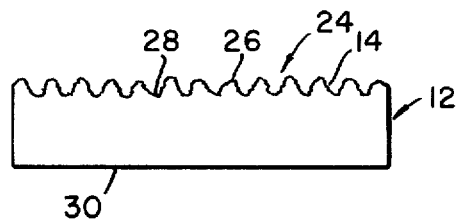
FIG. 4 is an enlarged side view of the glass member of the prevent invention showing the first surface after the step of grinding.

The sequence of the method of this invention is diagrammatically illustrated in FIG. 3 as involving the initial step of grinding contact surface 14 of the glass member to form irregularities, denotes generally by numeral 24 in FIG. 4, thereon. Irregularities 24 are formed as a series of peaks 26 and valleys 28. Abutting surface 14 is ground using conventional optical grinding grit having a grit size of substantially 22.5 microns to form a random multiplicity of the peaks and valleys thereon. The multiplicity of peaks and valleys form an irregular pattern on surface 14 which has the effect of breaking up the large dark and light fringes.

Should a larger grit size be used on surface 14 it will decrease the light transmissibility of the glass member by forming valleys of too great a depth. Further, by using a larger grit size the distance between adjacent peaks are much farther apartment causing large interference fringes to be formed between adjacent peaks 26 which may be large enough to appear on the raw stock film. Should a smaller grit size to be used it will decreased the distance between adjacent peaks and may not break up the dark and light fringes a sufficient amount so that they will still appear on the raw stock film. A grinding grit of the desired size has been found to produce the desired surface in that it allows for large light transmissibility while at the same time adequately disrupts the interference fringes 18 sufficiently so that they will not appear on the raw stock film.

It is preferred that the glass member have a chemical composition of calcium, potassium, and sodium oxides combined with silica. Such a glass composition is commonly known as plate glass and is preferred because the oxides are more susceptible to decomposition by the aqueous solution applied to the glass member as will be described later. Although the plate glass is preferred other types of glass may also be used such as, for example, PYREX glass which is composed of boron, sodium, and aluminum oxides combined with silica. However, PYREX glass is not as susceptible to decomposition by the aqueous solution as is plate glass.

Figure 5:
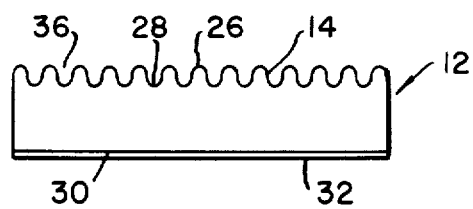
FIG. 5 is an enlarged side view of the glass member of FIG. 4 showing the surface after the step of bathing the surface with the aqueous solution.

Referring again to FIG. 3, the second step of the method involves bathing contact surface 14 with an aqueous solution of surfuric acid and hydrofluoric acid of polish the irregularities formed thereon by the grinding step. It is desirable that all of the surfaces of the glass member not be subjected to the aqueous solution because its total surface area would be subject to decomposition. It is therefore preferable to protect oppposedly faced glass surface 30 of glass member 12 from being contacted by the aqueous solution. This may be accomplished by convering surface 30 with an acid resistant material 32 such as electroplaters tape, as shown in FIG. 5.

After applying acid resistant material 32, surface 14 is bathed with the aqueous solution of sulfuric acid and hydrofluoric acid. The preferred manner of bathing surface 14 with the aqueous solution is to place the glass member in the conventional basket (not shown) and submerging both into the aqueous solution so that the aqueous solution completely covers and surrounds the glass member. Although the above method is preferred, surface 14 may be bathed by the aqueous solution in any convenient manner such as, for example, the glass member may be suspended in the aqueous solution so that only surface 14 is bathed. When using this method the electroplaters tape 32 need not be used since surface 30 will not be bathed by the aqueous solution. The aqueous solution of sulfuric acid and hydrofluoric acid attacks and decomposes peaks 26 and valleys 28 of surface 14. The decomposition smooths or polishes the roughened texture of the peaks and valleys, as shown in FIG. 5, thereby increasing the light transmissibility of the glass member. Polishing by the aqueous solution continues until the glass member is about 90 percent light transmissive.

To obtain the desired polishing effect it has been found that the composition of the aqueous solution is critical. The aqueous solution must contain between substantially 41.3 percent and 45.7 percent by volume of sulfuric acid and between substantially 54.3 percent and 58.7 percent volume of hydrofluoric acid. Although the above volume ranges will produce the desired effect it is preferred that the aqueous solution contain substantially 43.4 percent by volume of the sulfuric acid and 56.6 percent by volume of the hydrofluoric acid.

The hydrofluoric acid is used to attack and decompose the rough texture of the peaks and valleys and the sulfuric acid acts as a medium for holding the hydrofluoric acid in close proximity to surface 14. However, the hydrofluoric acid and sulfuric acid do not mix well together and therefore certain parts of surface 14 may be decomposed to a greater extent than other parts. This results in non-uniform polishing of the peaks and valleys over surface 14. It is therefore preferred that the glass member be rotated within the aqueous solution by conventional means such as, for example, by attaching the basket that is used to hold the glass member within the aqueous solution to a rotating mechanism such as an electric motor (not shown) or hand crank (not shown). By rotating the basket and glass member the hydrofluoric acid will contact all portions of surface 14 thereby uniformly polishing the peaks and valleys.

When using an aqueous solution having a mixture of 43.4 percent by volume of sulfuric acid and 56.6 percent by volumeof hydrofluoric acid a rotation rate between substantially 30 and 50 revolutions per minute will produce the desired uniformity of polishing although the preferred rotation rate is 40 revolutions per minute.

It has also been found that when using an aqueous solution of the preferred mixture and when rotating the glass member at the preferred rotation rate the glass member should be maintained within the aqueous solution for a time period of between substantially 105 seconds and 135 seconds. By allowing the glass member to remain within the preferred aqueous solution for a time period beyond 135 seconds the reaction of the hydrofluoric acid and the glass member will result in the formation of a thick layer of fluoride on surface 14 which has the detrimental effect of blocking further reaction of fresh hydrofluoric acid with the glass member. Further, it has been found that a longer length of time will cause the hydrofluoric acid to decompose the peaks to such a point that they will no longer disrupt interference fringes 18. Additionally, due to the non-uniformity of the chemical composition in the glass member, the hydrofluoric acid will attack certain portions of the glass member differently than other portions; thus the longer the glass member remains within the aqueous solution the more non-uniformity there will be between the separation and height of peaks 26 which is necessary for proper interference fringe 18 breakup and light transmissibility. If glass member 12 remains in the aqueous solution for a time less than 105 seconds the hydrofluoric acid will not sufficiently decompose the irregularities on peaks 26 and valleys 28 thereby preventing the proper transmissibility of light. It is preferred, however, that the glass member remain in the aqueous solution for substantially 2 minutes. This time period will insure that the irregularities on the peaks and valleys will be sufficiently polished to produce about 90 percent light transmissibility while at the same time insuring the disruption of interference fringes 18.

Another variable that must be controlled when treating contact surface 14 of glass member 12 is the temperature of the aqueous solution. If the temperature is too high the reaction between the hydrofluoric acid and surface 14 is too fast and the peaks are decomposed to the point where disruption of interference fringes 18 will not occur. If the temperature is too low the reaction is too slow and will not give the proper polishing effect to the peaks and valleys to insure proper light transmissibility. It has been found that for the preferred mixture of the aqueous solution and for the preferred time period the proper polishing effect will be achieved by an aqueous solution temperature range between substantially 70° and 75° F.

Referring again to FIG. 3 the final step of the process involves washing glass member 12 with a liquid to prevent further reaction between the aqueous solution and surface 14. After the glass member has been in the aqueous solution for the preferred time period the glass member is removed therefrom and immediately washed with a liquid having a temperature substantially lower than the temperature of the aqueous solution. It is preferred that the liquid be water which dilutes the aqueous solution to prevent further reaction between the aqueous solution and surface 14. It is preferred that the temperature of the water be between substantially 45° and 55° F. In addition to diluting the aqueous solution, the cooler water upon contacting the aqueous solution immediately lowers the temperature of the aqueous solution thereby slowing down any further reaction the aqueous solution will have the surface 14. After washing the glass member, the electroplaters tape is removed from surface 30.

Figure 6:
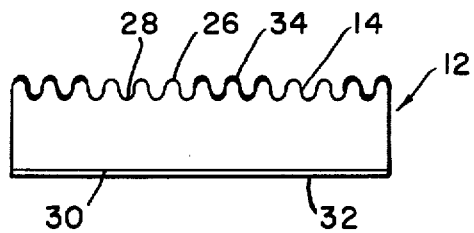
FIG. 6 is an enlarged side view of the glass member of FIG. 5 showing the surface with the fluoride layer formed thereon.

The reaction of the hydrofluoric acid with surface 14 will cause a very thin layer of fluoride 34 to be formed on surface 14 as shown in FIG. 6. This thin layer of fluoride may cover a small amount of hydrofluoric acid and prevent the water from washing it away. Thus, even after the step of washing surface 14, there may still remain a small amount of the aqueous solution on surface 14 which will continue to decompose the peaks and valleys. Following the step of washing, therefore, it is preferred that surface 14 be scraped with a soft bristle brush to loosen and breakup the thin fluoride layer. Following the step of scraping, surface 14 is rewashed with water to remove the excess fluroide layer and any other excess amounts of aqueous solution remaining on surface 14. Following the step of washing it is preferred that surface 14 be dried with any type of drying agent such as, for example, acetone.

Figure 7:
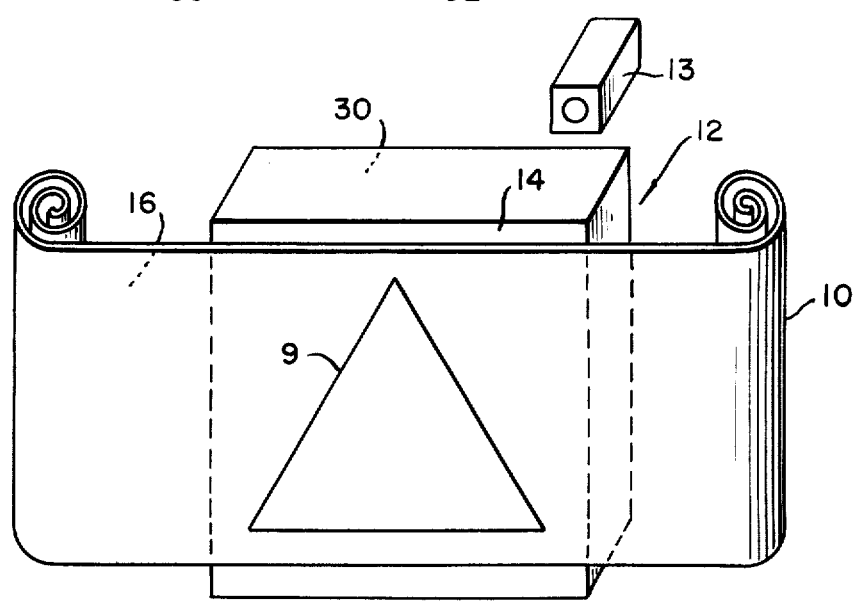
FIG. 7 is a perspective view of the glass member and transparent element of FIG. 1 after treatment of the surface.

The treatment of surface 14 of glass member 12 is now complete and peaks 26 and valleys 28 will sufficiently breakup interference fringes 18 so that they will not be reproduce on the raw stock film. As illustrated by FIG. 7, when film negative 10 is placed upon the treated surface 14 of the glass member and a light source 13 shines through them, a multiplicity of minute interference fringes (not shown) will be formed in space 36, FIG. 5, between adjacent peaks 26 which will be so small as not to be reproduced on the raw stock film. If a human eye were to replace the raw stock film it would also see image 9 without the interference fringes.

A method of treating a surface of a glass member has been disclosed for disrupting light interference fringes formed between the surface and a substantially abutting surface of a transparency. The problem associated with the interference fringes has been eliminated by properly treating the surface of the glass plate to sufficiently disrupt the interference fringes so that they will no longer be detectible. The problem of rapid degradation of the surface has been eliminated by removing the need for adding other material to the surface. Since the surface itself is treated to eliminate the interference fringes the problem of having to continuously check, test and replace material has also been eliminated thus substantially reducing the production cost in contact printing and enlarging processes.

Accordingly, the invention having been described in its best embodiment and mode of operation, that which is desired to be claimed by Letters Patent is:

1. A method of treating a glass member intended to abut a transparent element for disrupting the light interference fringes formed therebetween, comprising the steps of:

grinding the surface of the glass member intended to abut the transparent element with a grinding powder of substantially 22.5 microns to form a multiplicity of alternating peaks and valleys, said peaks and valleys permitting nondetectable light interference fringes to form within said valleys when said transparent element contacts said peaks;

bathing said surface with an aqueous solution having a temperature range of between substantially 70° and 75° F. and containing between substantially 41.3% and 45.7% by volume of sulfuric acid and between substantially 54.3% and 58.7% by volume of hydrofluoric acid for a time period of between substantially 105 and 135 seconds for polishing said peaks and valleys until said glass member is about 90% light transmissive; and washing said glass member with a liquid having a temperature range of between substantially 45° and 55° F. for preventing further reaction between said aqueous solution and said surface.

2. The method of claim 1 wherein said aqueous solution contains substantially 43.4% by volume of sulfuric acid and 56.6% by volume of hydrofluoric acid.

3. The method of claim 1 wherein the step of bathing involves the submerging of said surface into said aqueous solution.

4. The method of claim 3 further including the step of rotating said glass member within said aqueous solution.

5. The method of claim 4 wherein said glass member is rotated between substantially 30 and 50 revolutions per minute.

6. The method of claim 4 wherein said glass member is rotated at substantially 40 revolutions per minute.

7. The method of claim 1 wherein the step of bathing said surface in said aqueous solution is maintained for a time period of substantially 2 minutes.

8. The method of claim 1 further including the final step, of removing excess fluoride formed by the reaction of said aqueous solution with said glass member on said surface.

9. The method of claim 8 wherein the step of removing includes:

scraping said surface with a brush to loosen said excess fluoride;

washing said surface with water to remove said excess fluoride and;

drying said surface with acetone.

* * * * *